United States Patent [19]
Hoover

[11] Patent Number: 5,838,359
[45] Date of Patent: Nov. 17, 1998

[54] INTERPOLATED REFERENCE FOR IMPROVED DIGITAL FEEDBACK CONTROL REGULATION

[75] Inventor: Martin E. Hoover, Rochester, N.Y.

[73] Assignee: Xerox Corporation, Stamford, Conn.

[21] Appl. No.: 810,877

[22] Filed: Mar. 5, 1997

[51] Int. Cl.⁶ .................................................. G05B 19/02
[52] U.S. Cl. ........................... 347/250; 347/260; 318/810
[58] Field of Search .................................... 347/225, 235, 347/236, 237, 250, 260, 261; 318/609, 610, 808, 810

[56] References Cited

U.S. PATENT DOCUMENTS 5,208,796  5/1993  Wong et al. ............................... 369/97
5,381,165  1/1995  Lofthus et al. ........................... 347/232
5,441,389  8/1995  Wolcott et al. ............................ 417/42
5,530,642  6/1996  Lofthus et al. ........................... 347/261

Primary Examiner—N. Le
Assistant Examiner—Hai C. Pham
Attorney, Agent, or Firm—Ronald F. Chapuran

[57] ABSTRACT

A feedback control regulator including a regulated device, a sensor for providing a feedback signal representing a characteristic of the regulated device, and a reference signal. An interpolator provides mathematically manipulated feedback and reference signals and a summing function responds to the mathematically manipulated feedback and reference signals for providing and error signal. In particular, the feedback signal is augmented by 2x and the reference signal is augmented by 2x plus 1. A controller responds to the error signal for adjusting the characteristic of the regulated device.

12 Claims, 3 Drawing Sheets

INTERPOLATED REFERENCE FOR IMPROVED DIGITAL FEEDBACK CONTROL REGULATION

BACKGROUND AND MATERIAL DISCLOSURE STATEMENT

This invention relates generally to control regulation and, more particularly, to a 2x +1 interpolated reference method for improved digital feedback control regulation.

In recent years, laser printers have been increasingly utilized to produce output copies from input video data representing original image information. The printer typically uses a Raster Output Scanner (ROS) to expose the charged portions of the photoconductive member to record an electrostatic latent image thereon. Generally, a ROS has a laser for generating a collimated beam of monochromatic radiation. The laser beam is modulated in conformance with the image information. The modulated beam is reflected through a lens onto a scanning element, typically a rotating polygon having mirrored facets.

The light beam is reflected from a facet and thereafter focused to a "spot" on the photosensitive member. The rotation of the polygon causes the spot to scan across the photoconductive member in a fast scan (i.e., line scan) direction. Meanwhile, the photoconductive member is advanced relatively more slowly than the rate of the fast scan in a slow scan (process) direction which is orthogonal to the fast scan direction. In this way, the beam scans the recording medium in a raster scanning pattern. The light beam is intensity-modulated in accordance with an input image serial data stream at a rate such that individual picture elements ("pixels") of the image represented by the data stream are exposed on the photosensitive medium to form a latent image, which is then transferred to an appropriate image receiving medium such as paper. Laser printers may operate in either a single pass or multiple pass system.

In a multiple pass system, each image area on the photoreceptor surface must make at least three revolutions (passes) relative to the transverse scanline formed by the modulated laser beam generated by a ROS system. Each image must be registered to within a 0.1 mm circle or within a tolerance of ±0.05 mm. Each color image must be registered in both the photoreceptor process direction (slow scan registration) and in the direction perpendicular to the process direction (referred to as fast scan or lateral registration).

In systems requiring such precision, speed control of the rotating polygon is essential. In pending application D/94326, U.S. Ser. No. 08/510,998 filed Aug. 3, 1995, assigned to the same assignee as the present invention, there is disclosed a control that provides a start of scan (SOS) signal for each of the facets of a rotating polygon. The control determines the facet related to the first scanline of a first image exposure frame on a photoconductive member, and initiates the first scanline of each succeeding superimposed image exposure frame on the photoconductive member in relation to the facet related to the first scanline of the first image exposure frame. A time period measurement between a given facet occurrence to the same given facet repeat occurrence, relative to subsequent full revolutions of the polygon, provides an 'error free' electronic representation of the speed of the polygon. In addition, in pending application D/95651, U.S. Ser. No. 08/650728 filed May 20 1996, assigned to the same assignee as the present invention, there is disclosed a dual sensor speed control system that controls polygon speed with the laser in both the on and off states.

A difficulty, however, in the prior art is that improvements in feedback control and regulation are often relatively complex and costly. The sampled data resolution of quantized data often limits the regulation performance.

Thus, it would be desirable to improve the steady state performance of a regulator such as a speed regulator by eliminating negative error from the error band. It is an object of the present invention, therefore, to improve motion quality performance without increasing resolution in order to minimize cost yet meet more stringent printing performance. It is another object of the present invention to provide an interpolation of the digital reference and feedback numbers inside a digital feedback control loop to get a 2X improvement in regulation performance. Other advantages of the present invention will become apparent as the following description proceeds, and the features characterizing the invention will be pointed out with particularity in the claims annexed to and forming a part of this specification.

SUMMARY OF THE INVENTION

There is disclosed a feedback control regulator including a regulated device, a sensor for providing a feedback signal representing a characteristic of the regulated device, and a reference signal. An interpolator provides mathematically manipulated feedback and reference signals and a summing junction responds to the mathematically manipulated feedback and reference signals for providing an error signal. In particular, the feedback signal is augmented by 2x and the reference signal is augmented by 2x plus 1. A controller responds to the error signal for adjusting the characteristic of the regulated device.

For a better understanding of the present invention, reference may be had to the accompanying drawings wherein the same reference numerals have been applied to like parts and wherein:

DESCRIPTION OF THE INVENTION

Figure 1:
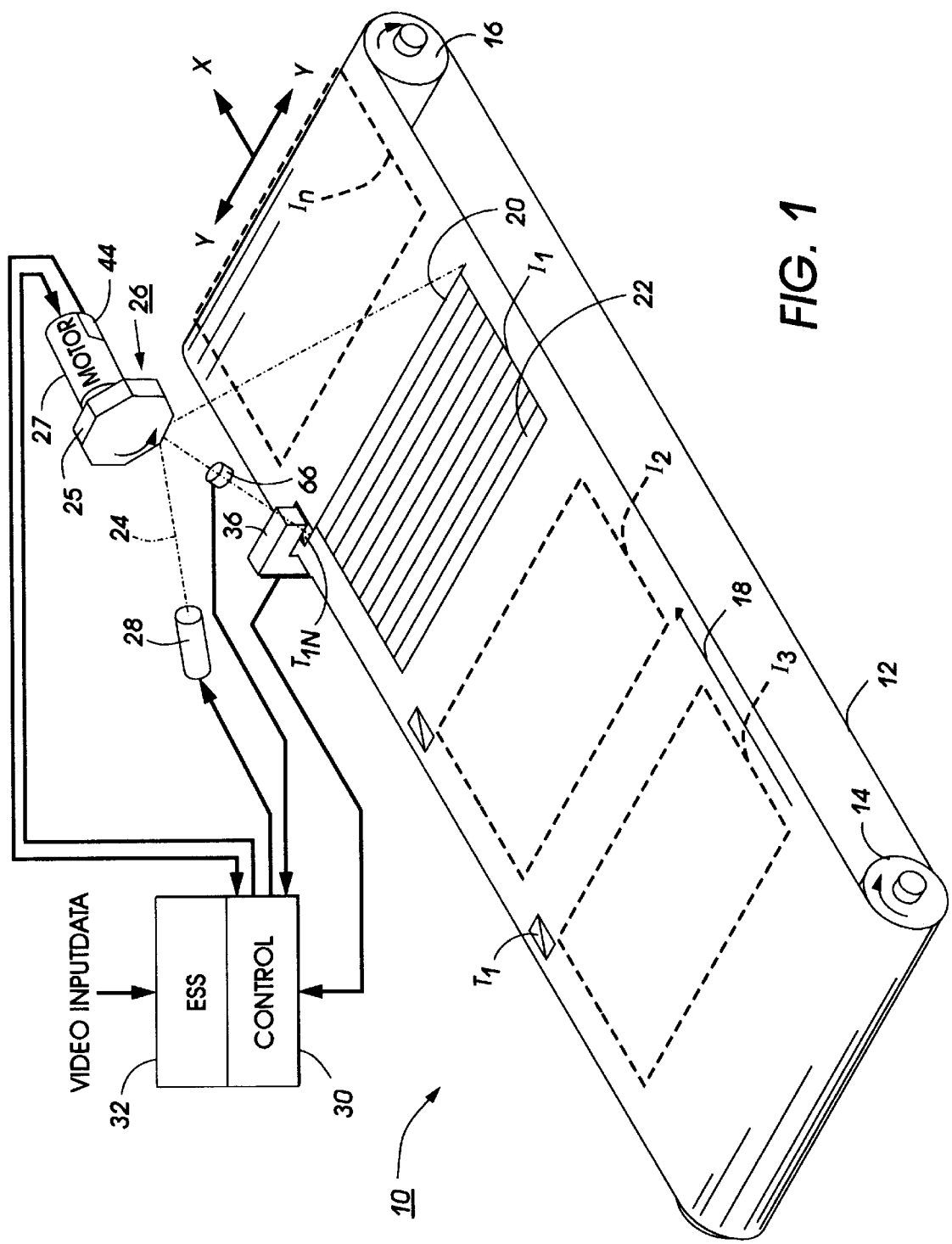
FIG. 1 shows a multi-pass ROS color printing system typical of systems requiring control regulation.

FIG. 1 illustrates a multi-pass xerographic printing system depicted schematically and designated generally by reference numeral 10. It should be understood that this system is merely an example of one system suitable for use of the present invention and that the scope of the invention covers a wide variety of systems and digital feedback controls. The system 10 includes a photoreceptive belt entrained about guide rollers 14 and 16, at least one of which is driven to advance the belt 12 in a longitudinal direction of processing travel depicted by the arrow 18. The length of the belt 12 is designed to accept an integral number of spaced image areas $l_1-l_n$ represented by dashed line rectangles in FIG. 1. As each of the image areas $l_1-l_n$ reaches a transverse line of scan 20, it is progressively exposed on closely spaced transverse raster lines 22 shown with exaggerated longitudinal spacing on the image area 11 in FIG. 1.

In the embodiment depicted in FIG. 1, the line 20 is scanned by a raster output scanner so that a modulated laser beam 24 is reflected to the line 20 by successive facets 25 on a rotatable polygon-shaped mirror 26 driven by motor 27 incorporating Hall sensors illustrated at 44, providing suitable feedback signals to control 30. The beam 24 is emitted by a laser device 28 such as a laser diode, operated by a laser drive module forming part of a control processor generally designated by the reference numeral 30. The processor 30 includes other not shown circuit or logic modules such as a scanner drive command circuit, by which operation of the motor 27 for rotating the polygon mirror 26 is controlled. A start of scan sensor, illustrated at 66 determines a start of scan reference point and provides suitable feedback signals to control 30.

In the operation of the system 10, as thus far described, the control 30 responds to a video signal to expose each raster line 22 to a linear segment of the video signal image. In xerographic color systems, each image area $l_1-l_n$, must be exposed in the same manner to four successive exposures, one for each of the three basic colors and black. In a multi-pass system such as the system 10, where only one raster output scanner or head is used, complete exposure of each image area requires four revolutions of the belt 12. The image areas $l_1-l_n$ are successively exposed on successive raster lines 22 as each raster line registers with a transverse scanline 20 as a result of longitudinal movement of the belt 12.

It is to be noted that the length of the transverse scan line 20 in system 10 is longer than the transverse dimension of the image areas l. Scanline length, in this respect, is determined by the length of each mirror facet 25 and exceeds the length of the raster lines 22. The length of each raster line is determined by the time during which the laser diode is active to reflect a modulated beam from each facet 25 on the rotating polygon 26 as determined by the laser drive module. Thus, the active portion of each transverse scan line may be shifted in a transverse direction by control of the laser drive module and the transverse position of the exposed raster lines 22, and image areas $l_1-l_n$, shifted in relation to the belt 12.

Adjustment of the active portion of the transverse scanline 20 for each succeeding image is needed to assure precise longitudinal alignment or transverse registration of the succeeding images with the first image irrespective of the lateral position of the belt during exposure of the images. This operation is achieved in substantial measure by the provision of targets aligned in the direction of belt travel and of a design to facilitate generation of a signal corresponding to the location of each target. In particular and in the multi-pass system of FIG. 1, targets $T_1-T_n$ are located along a marginal edge of the belt 12 to be aligned in a longitudinal direction and are spaced to be located slightly ahead of each image areas $l_1-l_n$ or upstream from each such area in the context of belt travel. A single sensor 36 is located to be aligned with targets T1–Tn for the image area passing the transverse scanline 20 in FIG. 1.

Downstream from the exposure station, a development station (not shown) develops the latent image formed in the preceding image area. After the last color exposure, a fully developed color image is then transferred to an output sheet. An electronic Sub System (ESS) 32 contains the circuit and logic modules which respond to input video data signals and other control and timing signals, to drive the photoreceptor belt 17 synchronously with the image exposure and to control the rotation of the polygon by the motor. For further details, reference is made to U.S. Pat. Nos. 5,381,165 and 5,208,796 incorporated herein.

As illustrated any suitable marker on the photoconductive surface or belt or any suitable hole provides a reference for each projected image on the belt surface. In other words, the detection by sensor of a mark or hole in the photoconductive surface establishes the first scanline of the projected image and in a multi pass image on image system, helps to establish image on image registration. In addition, the start of scan signals indicate the scanning laser beam to be at a start of scan position with reference to the photoconductive surface.

Generally, in the prior art, with a polygon of eight facets, the detected start of scan signal for each of eight facets on a polygon are used to inject a phase shift into the polygon motor. In particular, a polygon controller monitors the SOS signals from each of the facets, as the polygon rotates, to either speed up or slow down the rotating polygon to maintain uniform rotation. Thus there is a closed loop control from the SOS detector to maintain a uniform speed of rotation of the polygon while printing the image. There is also a positional control that enables shifting SOS signals to correct image start time.

Figure 2:
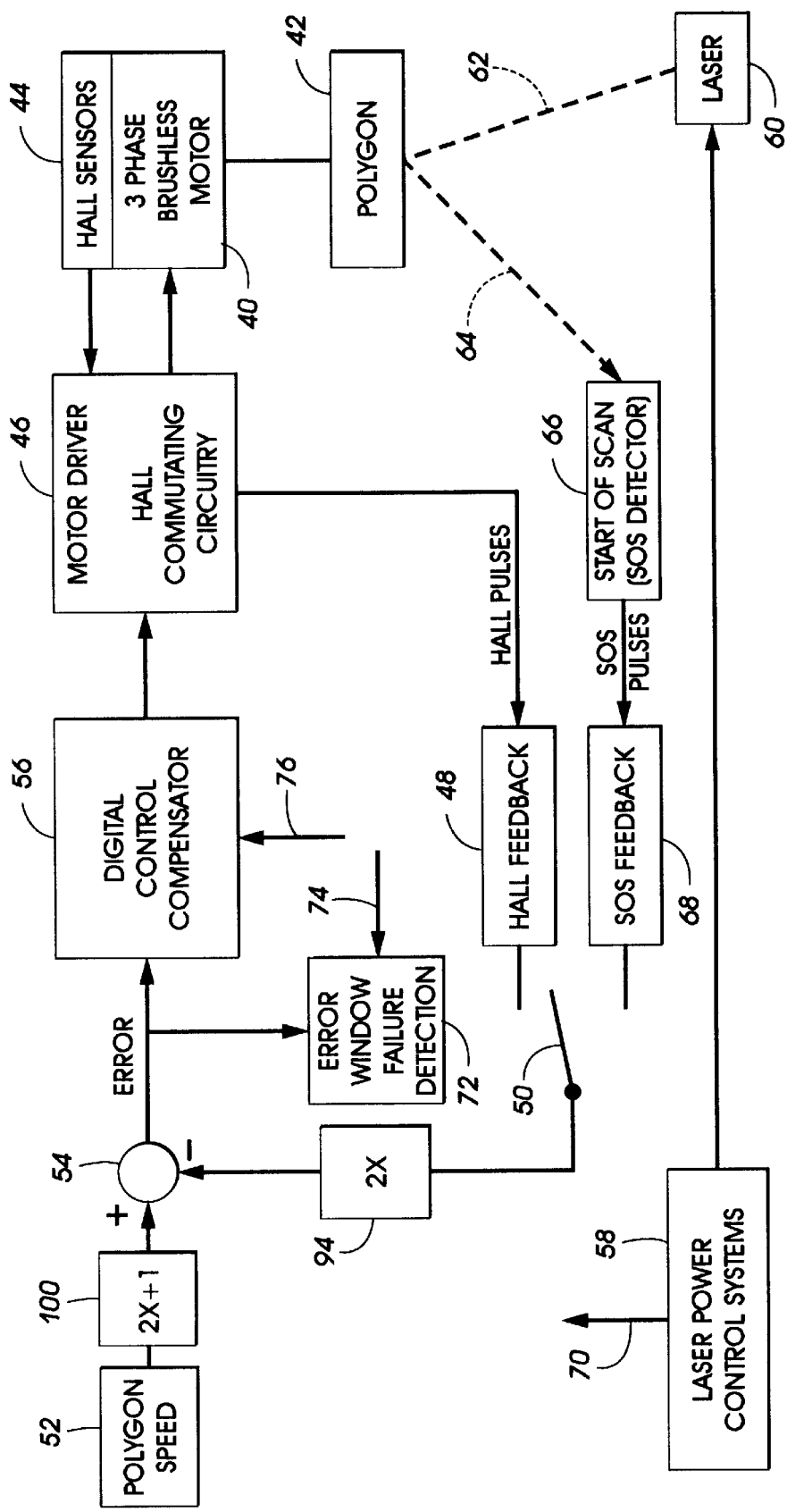
FIG. 2 illustrates a two loop polygon speed control system suitable for use of the present invention.

With reference to FIG. 2, there is illustrated a dynamic switching speed control. A three phase brushless motor 27, a typical motor for driving a rotating polygon, is shown driving polygon 42. Within the 3-phase brushless motor on a printed circuit board are the Hall sensors or magnetic switches 44 providing signals based upon the speed of the motor 40. The brushless motor 27, polygon 42, and Hall sensors 44 comprise an assembly referred to as the motor polygon assembly. The Hall sensor signals are conveyed to Hall commuting circuitry 46 to Hall feedback circuitry 48 for converting either to a frequency or period between pulses signal.

Also disclosed in FIG. 2, is a laser power control system 58 to drive laser 60 providing a laser beam 62 reflected from rotating polygon 42 providing a reflected signal to a not shown photoreceptor surface, a portion 64 of the reflected laser signal being sensed by a start of scan detector 66 providing signals to SOS feedback circuitry 68.

A switch 50 engages either the Hall feedback circuitry 48 or the SOS feedback circuitry 68 to provide alternate feedback source signals to a single control loop to control the speed of the polygon 42. With the switch 50 in communication with Hall feedback circuitry 48, the Hall feedback signals are conveyed to a summing junction 54 for comparing with a reference signal shown at 52. In accordance with the present invention, math interpolator 94 (2x) connects switch 50 with function 54 and math interpolator 100 (2x +1) connector polygon speed reference signal 100 to junction 54. An error signal is conveyed to a digital control compensator 56 for controlling the speed of polygon 42 via the motor driver circuitry 46. When the laser power control system 58 is ready to drive laser 60 to reflect modulated laser beams from polygon 42 onto the moving photoreceptor surface, and appropriate signal 70 is provided to the switch 50 for the switch 50 to communicate with the SOS feedback circuitry 68.

The SOS feedback circuitry 68 is then connected to the summing junction 54 to compare the start of scan signals from start of scan circuitry 66 with reference 52 to provide a suitable error signal to digital control compensator 56 for controlling the speed for driving motor 40 to control the speed of polygon 42 via the amplifier driver circuitry 46. It should be noted the error window detect circuitry 72 and the digital control compensator circuitry 76 are adjusted depending upon whether the system is in the Hall feedback loop or the SOS feedback loop. The error window detection parameters as well as the compensator gain parameters are changed as the feedback loop is alternated between Hall feedback and SOS feedback.

Thus, there is a dynamic feedback switching control to alternate between a very high precision polygon speed and position control using start of scan signals when the laser power control system is on and a less precise Hall sensor signal feedback speed control when the laser is turned off. The Hall speed control enables the system to have a very smooth and very rapid transition to a very precise SOS speed control at the moment the laser is ready to switch to the image printing mode.

A system of dynamic switching between feedback sources allows the use of Start Of Scan (SOS) feedback in order to attain a higher performance motion control of a rotating polygon while at the same time overcomes the problem of loss of control upon loss of SOS signals when the laser is disabled or for some reason the SOS signal fails. Using SOS feedback attains the motion quality performance without adding a separate motion encoder feedback device as part of the polygon motor assembly (as used in previous high quality systems). This represents a considerable cost savings.

The use of SOS feedback within the polygon motor control is also needed to enable implementation of polygon rephasing involved with Image On Image (IOI) color printing. This system enables the use of SOS feedback and subsequently enables accurate phase shifting of SOS to a desired image start point. The rephase function also requires polygon control with fast response (bandwidth) in order to actuate the rephase within a short time. The motor controls that use only HALL feedback require stiff low pass filters to avoid jitter noise in the HALL signal from disturbing speed regulation. Fast responding motor rephasing is not possible with these dominant low pass filters present.

The motor control begins by spinning up the polygon and exercises control using the Hall feedback. The Hall feedback has destabilizing jitter noise and requires a lower loop gain to provide stable motor control. The limits of the error window detector are then opened up further to prevent the Hall noise from triggering interpretation of motor control regulation failure. The laser control is enabled and the laser is initialized into the on state. The recognition of the laser status is used to dynamically switch the polygon control over to the SOS signal as the feedback. The loop compensation gains are increased to provide a high bandwidth servo loop and improve motion regulation quality. The error window detection limits are reduced to enable optimal detection of motor speed regulation with tighter error limits.

Both the HALL and the SOS feedback measurements are active such that the system is able to smoothly transition between each of the two feedback sources. The digital control compensator is implemented with an integrator in parallel with proportional control such that changing the gain of the compensation does not cause disturbances of motor speed at the transition of switching feedback sources. It should be understood that this is only one example of a system suitable for incorporating the present invention and that there are innumerable digital feedback control systems applicable for the present invention. For example, the present invention could be part of any digital or sample data control for controlling a (ROS) polygon motor, controlling an encoder driven photoreceptor belt, or for laser power control.

The invention is a method of implementing an interpolation of the digital reference and feedback numbers inside a digital feedback control loop to get a 2X improvement in regulation performance. In the case described, the method is directly applied to Motor Polygon Assembly (MPA) speed control regulation to provide motion quality for scanning laser beams within a Raster Output Scanner (ROS) subsystem. The method is applicable to many systems that utilize a digital feedback control loop. By using this method the steady state performance of the speed regulator is 2X improved by eliminating the negative error (−bit) from the error band. The implementation is simple yet has demonstrated a marked improvement in performance.

By way of background, one characteristic of a digital control loop with an integrator added to supply steady state error of zero is that the regulation is held to within +/−1 bit of error. The control loop functions to hold the error to zero where the integrator ramps up on output error. However, the system will hunt back and forth between +/−1 bit of error such that the steady state error will be a +/−1 error window. The sampled data resolution or granularity of quantized data therefore limits the regulation performance. It was desired to improve motion quality performance without increasing resolution in order to minimize cost yet meet the more stringent performance goals of color printing.

The method employed is a mathematical manipulation of both the reference and feedback numbers within the digital control loop to simulate the effect of an increased resolution of quantized sampled feedback data. The reference number is multiplied by 2 and 1 added to implement an odd only reference number. The feedback is multiplied by 2 which leads to an even only number. The end result is when the reference and feedback numbers are subtracted to calculate error, the new error will still be controlled within the window of +/−1 bit. The new 2X error bits are actually +/−0.5 bit of the actual error. This results in a situation where there is always a minimum error of + or −1 bit, but the control loop now hunts within a smaller error window. The net result is that the output being controlled is held within a tighter window delivering a 2X improvement in regulation performance.

There are features of this method that make it very easy to implement even in the most inexpensive microcontrollers. Most micros suited for this type application have a shift left function as an instruction. This shift is a very simple way of implementing the 2X multiply with very little impact on real time or other microcontroller resources. There also usually exists a shift through a flag that can be set prior to the shift. This implements the 2X +1 function very nicely. Realize that the 2X +1 function acting on the reference could also be done off line resulting in a different number as the reference that can only be of odd value. This implies that an equally performing system may be attained at lower cost or the performance may be increased at the expense of minimal hit in real time from the extra 2X calculation involved.

Figure 3:
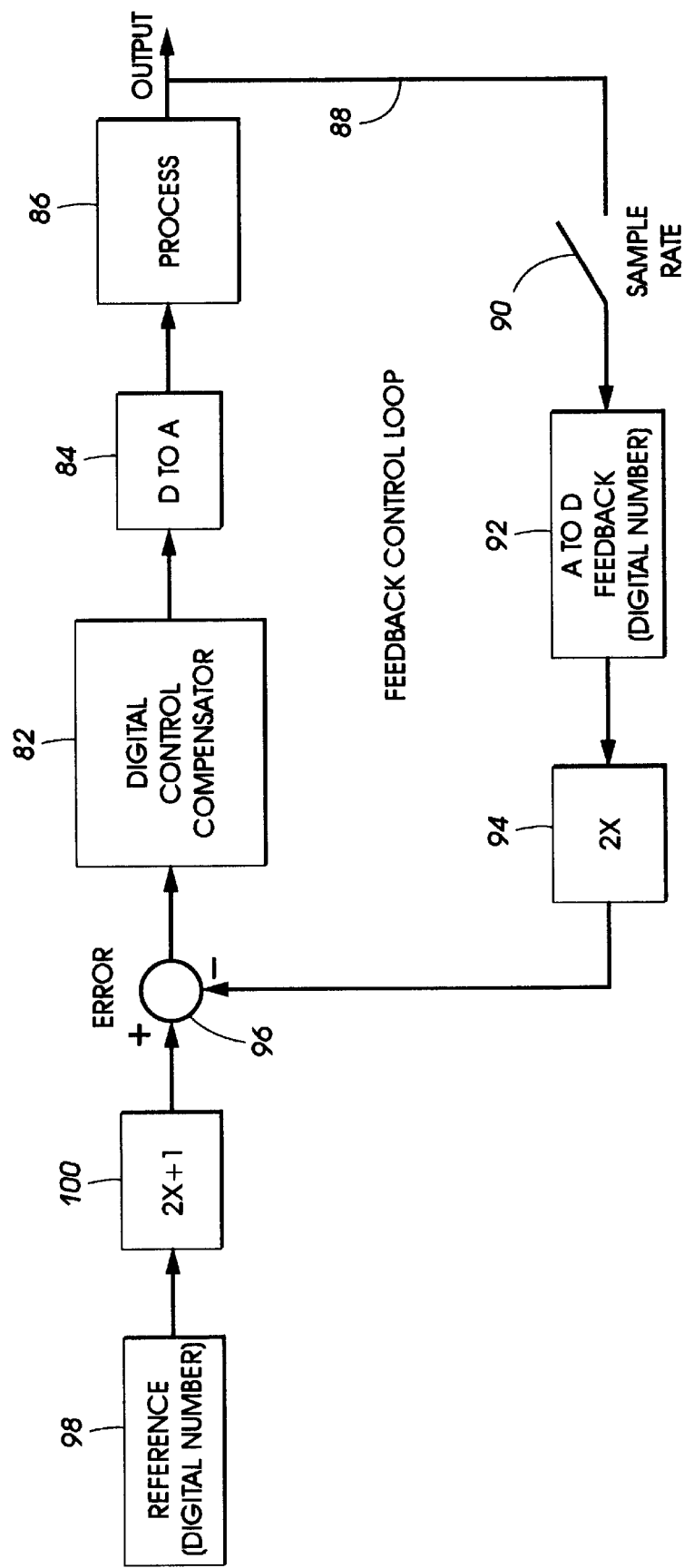
FIG. 3 is a block diagram illustrating digital feedback control in accordance with the present invention.

With reference to FIG. 3, there is a general block diagram illustrating digital feedback control in accordance with the present invention as described above. In particular, digital control compensator 82 operates a given feature or process, generally shown at 86 via digital to analog converter 84. A suitable sensed parameter or feedback signal, generally shown at 88, provides a measure of a given characteristic that is periodically sampled as illustrated at 90. The sampled parameter is converted to a digital number in analog to digital converter 92 and compared to a reference 98 digital number in comparator 96 to produce an error signal to appropriately adjust the process 86 via controller 82. However, in accordance with the present invention, as discussed above, the output of converter 92 is mathematically manipulated in interpolator 94 before inputting to summing function 96 and reference 98 is mathematically manipulated in interpolator 100 before inputting to summing function 96. The interpolator math blocks 94 and 100 collapse the limit cycle or hunting between two values rather than three values in the overall control.

While the invention has been described with reference to the structure disclosed, it will be appreciated that numerous changes and modifications are likely to occur to those skilled in the art, and it is intended to cover all changes and modifications which fall within the true spirit and scope of the invention.

What is claimed is:

1. An imaging system for forming images on a photoconductive member moving in a process direction including:

a raster output scanner including a laser forming a plurality of scanlines in a transverse direction across the width of said member by reflecting modulated beams from a plurality of facets of a rotating polygon, a motor for rotating the polygon, a sensor for providing a signal representing signal speed of the polygon, a first interpolator, 2x, responsive to the signal representing the speed of the polygon wherein x is a positive integer number, a reference signal, a second interpolator, 2x+1, responsive to the reference signal, a summing device connected to the first and the second interpolators for providing an error signal, and a controller responsive to the error signal for controlling the motor to adjust the speed of the polygon.

2. The system of claim 1 wherein the first and second interpolators are mathematical manipulators.

3. The system of claim 1 wherein the sensor is a Hall effect magnetic sensor mounted with respect to the motor.

4. The system of claim 1 wherein the sensor provides a start of scan (SOS) signal representing the detection of a beginning of a scanline.

5. The system of claim 1 wherein the controller includes compensation parameters to adjust the speed of the polygon.

6. An imaging system for forming images on a photoconductive member including:

a raster output scanner reflecting modulated beams from a plurality of facets of a rotating polygon, a motor for rotating the polygon, a sensor for providing a feedback signal representing the speed of the polygon, a reference signal, an integrator to manipulate the feedback and reference signals wherein the manipulated feedback and reference signals are digital signals mathematically manipulated to simulate increased resolution, wherein one of the feedback and reference signals provides an odd digital number and the other provides an even digital number, circuitry responding to the manipulated feedback and reference signals for providing an error signal, and a controller responsive to the error signal for controlling the motor to adjust the speed of the polygon.

7. The system of claim 6 wherein the feedback and reference signals are multiplied by an even number and one of the feedback and reference signals is increased by 1.

8. The system of claim 7 wherein the feedback signal is augmented by 2x and the reference signal is augmented by 2x plus 1, wherein x is a positive integer number.

9. A feedback control regulator including:

a regulated device, a sensor for providing a feedback signal representing a characteristic of the regulated device, a reference signal, an interpolator to mathematically manipulate the feedback and reference signals a device responding to the mathematically manipulated feedback and reference signals for providing an error signal, wherein one of the mathematically manipulated feedback and reference signals provides an odd digital number and the other provides an even digital number, and a controller responsive to the error signal for adjusting the characteristic of the regulated device.

10. The system of claim 9 wherein the manipulated feedback and reference signals are digital signals mathematically manipulated to simulate increased resolution.

11. The system of claim 9 wherein the feedback and reference signals are multiplied by an even number and one of the feedback and reference signals is increased by 1.

12. The system of claim 9 wherein the feedback signal is augmented by 2x and the reference signal is augmented by 2x plus 1, wherein x is a positive integer number.

* * * * *